United States Patent [19]

Ashley

[11] Patent Number: 5,265,185
[45] Date of Patent: Nov. 23, 1993

[54] OPTICAL WAVEGUIDES IN ELECTRO-OPTICAL POLYMERS AND METHOD

[75] Inventor: Paul R. Ashley, Toney, Ala.

[73] Assignee: The United States of America as represented by the Secretary of the Army, Washington, D.C.

[21] Appl. No.: 955,796

[22] Filed: Oct. 2, 1992

[51] Int. Cl.⁵ .................................... G02B 6/10
[52] U.S. Cl. ...................... 385/132; 385/129; 430/97
[58] Field of Search .............. 385/129, 130, 131, 132; 430/97

[56] References Cited

U.S. PATENT DOCUMENTS

| 4,047,795 | 9/1977 | Hughes et al. ............ 385/130 X |
| 5,054,872 | 10/1991 | Fan et al. .................... 385/130 |

*Primary Examiner*—John D. Lee
*Assistant Examiner*—Phan T. Heartney
*Attorney, Agent, or Firm*—Freddie M. Bush; Howard G. Garner

[57] ABSTRACT

A method of fabricating composite optical channel waveguides in electro-optical polymers. An electrically conductive substrate is coated with an ultraviolet epoxy resin which is cured by subjecting the composite to an ultraviolet light. Another layer of ultraviolet epoxy resin is applied and developed into a predetermined waveguide configuration by selective curing. The uncured epoxy is removed with a solvent which does not effect the cured ultraviolet epoxy resin. A non-linear polymer is coated over the composite and a gold electrode is deposited on its upper surface for poling purposes. After poling, the gold electrode is removed and an upper cladding is applied along with the device electrode. The invention also provides a novel waveguide as produced by the method. Where a simple waveguide is desired, the steps of applying the gold film, poling, heating, and acid etching the gold film may be omitted.

19 Claims, 2 Drawing Sheets

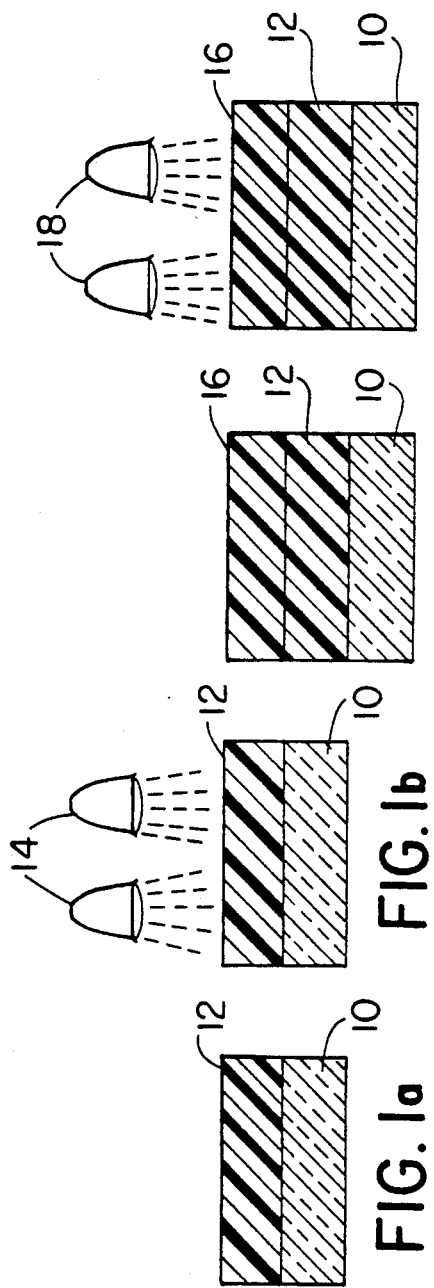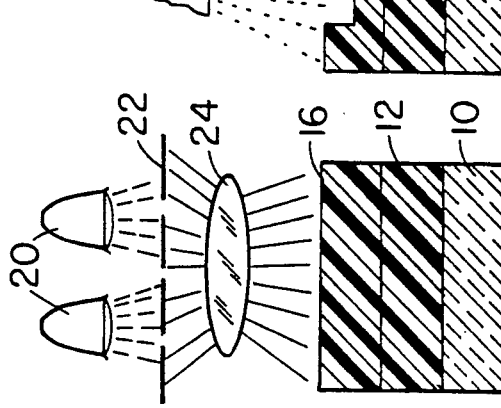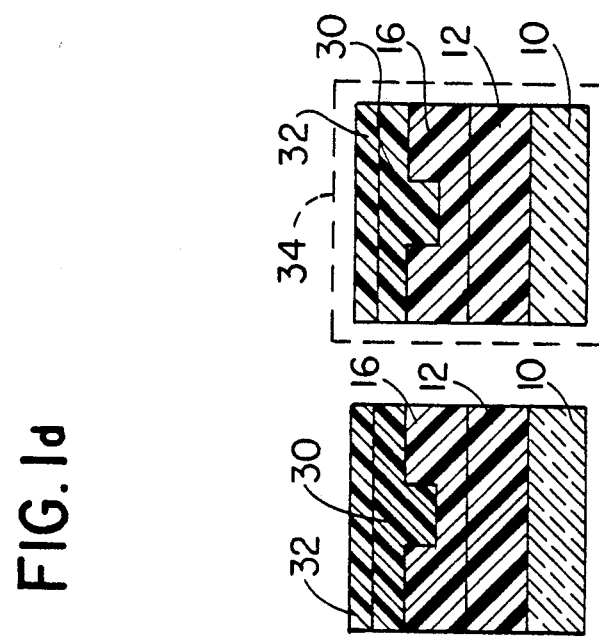

OPTICAL WAVEGUIDES IN ELECTRO-OPTICAL POLYMERS AND METHOD

DEDICATORY CLAUSE

The invention described herein may be manufactured, used, and licensed by or for the Government for governmental purposes without the payment to me of any royalties thereon.

BACKGROUND OF THE INVENTION

This invention relates to optical waveguides in electro-optical polymers produced by projection printing with photopolymers. More particularly, this invention relates to a method of producing optical waveguides in electro-optical polymers.

Polymer films have been the object of renewed research as organic polymers with large second order non-linearities become available. One of the remaining problems for waveguide application is in the development of suitable cladding materials for optical confinement in channel waveguides. These materials must be capable of being fabricated into thin films and patterned for low loss waveguide construction with design flexibility.

SUMMARY OF THE INVENTION

It is an object of this invention to provide an optical waveguide in electro-optical polymers.

It is another object of this invention to provide an efficient, simple process for forming optical waveguides in electro-optical polymers by projection printing with photopolymers.

It is another object of the invention to provide a poled optical waveguide in electro-optical polymers.

In accordance with the invention, a composite optical waveguide is prepared in electro-optical polymers by spin-coating a layer of an electrically conductive coated glass with a first layer of ultraviolet epoxy resin of a uniform thickness. This layer of epoxy resin is cured by exposing it to ultraviolet light until the resin is cured. Thereafter, a second layer of ultraviolet epoxy resin is spin-coated onto the first layer of cured epoxy resin. This layer is partially cured by subjecting it to uniform ultraviolet light. Thereafter, a patterned beam of ultraviolet light is directed onto the partially cured, second layer of epoxy resin to completely cure that layer of resin in a predetermined pattern to form the waveguide.

Thereafter, the composite is washed with a solvent for the partially cured epoxy resin which does not affect the cured waveguide pattern, so as to remove the partially cured epoxy resin and to develop the predetermined grooved pattern of cured epoxy resin. The grooved patterned layer of epoxy resin is then spin-coated with an active polymer to fill the pattern layer and to provide a uniform, even surface on the substrate. The polymer layer is then coated with a thin gold film to provide an electrode on the upper surface of the composite. The composite is then heated in an oven to the glass-transition temperature of the polymer. The composite is then poled by applying a voltage to the gold film on the surface of the polymer to complete the waveguide. Thereafter, the gold film is removed from the composite by chemical etching and the composite is coated with a cladding layer of epoxy resin and the composite is then cured with ultraviolet light until the composite solidifies.

If a simple waveguide is desired, the steps of applying a thin gold film to the upper surface of the composite, the heating step, and the poling step can be omitted.

The invention also comprises the waveguide formed by the process.

BRIEF DESCRIPTION OF THE DRAWINGS

FIGS. (1a–1m) is a schematic outline of the method steps of the invention.

DETAILED DESCRIPTION OF THE INVENTION

Figure 1J:
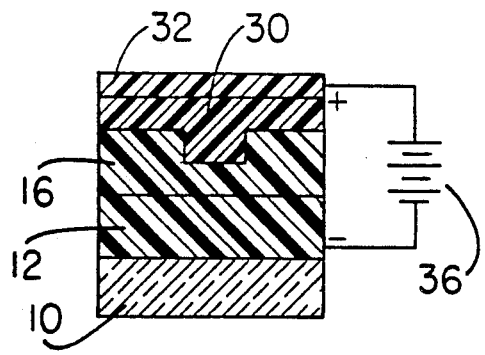

Referring now to FIGS. (1a–1m) of the drawings, which includes a series of sub-figures 1a–1m, which outline the steps of the method of the invention. In FIG. 1a, a substrate 10 which has a conductive coating on it, is spin-coated with a first layer of ultraviolet epoxy resin 12 to form a composite structure. In FIG. 1b, resin layer 12 is subjected to ultraviolet light from light source 14 to cure the resin layer 12.

In FIG. 1c, the composite structure of substrate 10 and cured resin 12 receives a second layer of ultraviolet epoxy resin 16, and, in FIG. 1b, the second layer of epoxy resin coating is subjected to ultraviolet light from ultraviolet light source 18 to partially cure the epoxy resin coating 16. It is important that the curing of layer 16 be partial to the extent that it will still be subject to the action of a solvent such as acetone.

The composite structure of layers 10, 12, and 16 is then subjected to ultraviolet light in a pattern for forming the waveguide. In this step, ultraviolet light from light source 20 is projected through a print mask 22 which corresponds to the pattern desired to be formed in layer 16. This light is projected through a lens 24 which focuses the ultraviolet light onto layer 16 in the pattern predetermined to form the waveguide out of layer 16. The epoxy resin of layer 16 is completely cured only in the areas outside of the areas where the waveguide is desired. After the complete curing step in FIG. 1e, the complete composite structure of layers 10, 12, and 16 is then subjected to a washing or developing in FIG. 1f wherein an acetone solution is applied to layer 16 from a washer head or other developer solvent source 26 to dissolve out the uncured epoxy from layer 16 and to produce the grooved waveguide 28.

After the uncured epoxy is removed from layer 16, the composite structure is subjected to a spin-coating process in FIG. 1g to provide an active electro-optical polymer 30 (for example, Hoechst Celanese PC 6S with an active side chain with a methacrylate in solution which is available from Hoechst Celanese in Summit, N.J.). This active polymer fills the grooved pattern areas 28. A layer 32 of gold is spincoated onto the substrate in FIG. 1h to provide an electrode for poling purposes. The composite structure is then subjected to baking in an oven 34 to remove all remnants of the solvent. The composite is heated in the oven to the glass transition temperature of the active polymer in layer 30.

After the baking step is completed and all of the solvent has been removed from the composite, the composite is poled as seen in FIG. 1j wherein an electrical voltage is applied to layers 32 and 12 by a power source 36. This power source may be a battery or other voltage source.

Figure 1K:
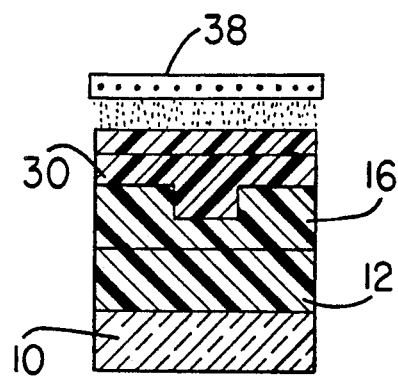
Figure 1L:
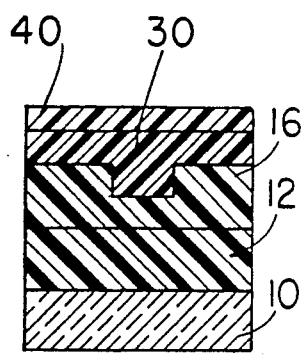
Figure 1M:
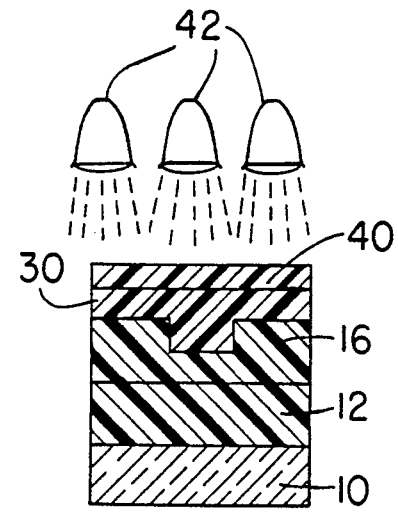

After the composite is poled, it is then subjected to an acid etching process in FIG. 1k with an acid (This etchant is available from the Transeve Co., and is diluted with distilled water) which will chemically etch the gold layer and remove it from the surface of polymer 30. A third layer of epoxy resin coating 40 is then applied to the composite structure in FIG. 1L to provide the upper cladding for the waveguide and the composite structure is then subjected to a final curing by ultraviolet light from light source 42 in FIG. 1m until the waveguide is completely hardened and cladding are 40 is completely cured.

Figure 2:
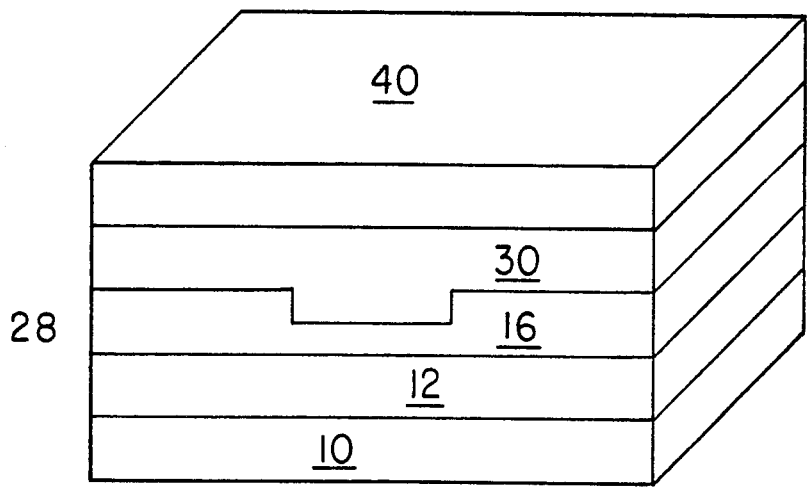
FIG. 2 is a perspective view of the waveguide of the invention.

Referring now to FIG. 2 wherein the cured composite structure waveguide is illustrated in perspective. The waveguide illustrated in FIG. 2 can be used to make modulators, frequency shifters, phase shifters and other electro-optical devices for signal processing, such as radar and image processors and sensors such as optical gyroscopes. It can also be used in numerical processors such as optical computers.

The advantages of the process of the invention is that it gives more precise control of the dimensions and smoother walls and surfaces and is less involved than the photo-resistant process previously used in that it has less steps. The process will work on substrates other than glass, such as silicon electronic chips for optical waveguides but the substrate must be smooth, hard and flat.

While a specific embodiment of the invention has been described hereinabove for purposes of illustration, it is to be understood that the invention is not limited to the specifics set forth in the described embodiment.

While epoxy resins have been described, it should be understood that a variety of ultraviolet light curing polymers can be used in place of the epoxy resins. These polymers are well known to the artisan.

The active polymer can be any electro-optic polymer which can be spincast and has a low optical absorption at the operating wave length. Active side chain polymers such as Hoechst Celanese PC 6S or Dow Chemical TP-7 has been found to be acceptable.

Any electrically conductive substrate or a non-electrically conductive substrate coated with an electrically conductive substance can be used instead of the coated glass, described above. Examples of such substrates are crystalline silicon or non-conductive plastic substrates coated with indium tin oxide, gold, aluminum, or other electrically conductive metals.

In one example, an ultraviolet-curing, optical epoxy resin (Norland Products NOA 61) having a refractive index of n=1.56 was modified for use with a projection printing system operating at the Hg G-line (436 nm). A photo-initiator, camphor quinone was added (18% by wt) to the composite. The absorption peak, near 465 nm, provided sufficient sensitivity. The applicable dose required for curing was 1-3 J/cm$^2$. A short pre-exposure (30-60 seconds) with an ultraviolet source was used after spin-coating the epoxy. This stabilized the epoxy by significantly reducing the viscosity of the epoxy resin to avoid pinhole formation and reduced the required pattern exposure time. In addition, the pre-exposure allowed one step processing of the complete lower cladding structure including the channels.

The epoxy resin was exposed to form the channel which defines the waveguide. The uncured epoxy was removed with acetone. The thickness of the lower cladding under the channel is determined by the pre-exposure dosage and the depth of the channel by the pattern exposure dosage. A non-linear polymer (Hoechst Celanese PC 6S) was spin-coated over the cladding to a thickness of 2 microns and a gold electrode, 2500 angstroms thick, was deposited on the surface of the composite for poling. After the poling, the gold electrode was removed by acid etching, using Transeve Company TFA 3:1, diluted with distilled water and an upper cladding layer was applied.

The side walls formed are near Gaussian in shape. Modification or tailoring to other shapes and depths is possible by adjusting the pre-exposure and pattern exposure. Typical single mode cladding dimensions were 1-2 $\mu$m channel (ridge) depth and 3.5 $\mu$m channel width with a total guide thickness of 2-4 $\mu$m.

The channel guide was tested at 1.3 $\mu$m wavelength. The output TM mode profile for the single mode guide was measured to be about 2.5 $\mu$m deep by 3.5 $\mu$m wide, (full width, half maximum). The measure propagation loss of the waveguide was <3 dB/cm.

While the preferred embodiment of the invention described above has included the steps of coating the composite with a thin fold film, heating the coated composite, poling the waveguide, and acid etching the gold film to remove it, a simple waveguide is complete without employing these steps where a poled waveguide is not needed or wanted.

Such a simple waveguide can be used for passive optical inter-connects, optical delay lines, and optical distribution networks, while the poled waveguides can be used as optical modulators, switches, and polarizers.

I claim:

1. A method of fabricating poled composite optical grooved channel waveguide in electro-optical polymers, comprising the following steps:
    (a) spin-coating a glass substrate, coated with an electrically conductive metal, with a first layer of an ultraviolet epoxy resin of a uniform thickness to form a composite;
    (b) curing said first layer of ultraviolet epoxy resin coating by exposing it to ultraviolet light until said epoxy resin layer is cured;
    (c) spin-coating a second layer of ultraviolet epoxy resin of a uniform thickness onto said first layer of cured epoxy resin;
    (d) partially curing said second layer of epoxy resin with uniform ultraviolet light;
    (e) directed a patterned beam of ultraviolet light onto said partially cured second layer of epoxy resin to completely cure said second layer of epoxy except in a predetermined grooved waveguide pattern;
    (f) washing said second layer of epoxy resin with a solvent for the partially cured epoxy resin in said second layer to remove said partially cured epoxy resin to develop the predetermined grooved pattern of cured epoxy resin for said waveguide;
    (g) spin-coating said second layer of epoxy resin with an active polymer to fill said predetermined grooved pattern and to provide a uniform surface on said polymer layer;
    (h) coating said polymer layer with a thin gold film to provide an electrode on the upper surface of said composite;
    (i) heating said composite in an oven to the glass-transition temperature of said active polymer;
    (j) poling said composite by applying a voltage to said gold film on the surface of said composite;
    (k) removing said gold film from said substrate by and etching;
    (l) coating said etched layer of said composite with a cladding layer of ultraviolet epoxy resin; and (m) curing said composite with ultraviolet light until said composite solidifies.

2. A method as set forth in claim 1, wherein said gold film coating is produced by a vacuum-evaporative process.

3. A poled composite optical channel waveguide produced by the process set forth in claim 1.

4. A poled, cured composite optical grooved channel waveguide in electro-optical polymers, comprising:
   (a) an electrically conductive substrate having a cured first layer of an ultraviolet epoxy resin of a uniform thickness;
   (b) a second layer of epoxy resin cured in a predetermined grooved pattern on said first layer of said ultraviolet epoxy resin to provide a waveguide;
   (c) an active polymer disposed in said predetermined grooved pattern, to a depth equal to the depth of said predetermined grooved pattern; and
   (d) a cladding layer disposed on said second layer of epoxy and active polymer.

5. A waveguide as set forth in claim 4, wherein said substrate is glass coated with an electrically conductive metal.

6. A waveguide as set forth in claim 5, wherein said electrically conductive metal is gold.

7. A waveguide as set forth in claim 5, wherein said electrically conductive metal is indium tin oxide.

8. A waveguide as set forth in claim 5, wherein said electrically conductive metal is aluminum.

9. A waveguide as set forth in claim 4, wherein said substrate is crystalline silicon.

10. A waveguide as set forth in claim 4, wherein said substrate is a plastic coated with electrically conductive metal.

11. A method of fabricating composite optical grooved channel waveguides in electro-optical polymers, comprising the following steps:
   (a) spin-coating a glass substrate, coated with an electrically conductive metal, with a first layer of an ultraviolet epoxy resin of a uniform thickness to form a composite;
   (b) curing said first layer of ultraviolet epoxy resin coating by exposing it to ultraviolet light until said epoxy resin layer is cured;
   (c) spin-coating a second layer of ultraviolet epoxy resin of a uniform thickness onto said first layer of cured epoxy resin;
   (d) partially curing said second layer of epoxy resin with uniform ultraviolet light;
   (e) directed a patterned beam of ultraviolet light onto said partially cured second layer of epoxy resin to completely cure said second layer of epoxy except in a predetermined grooved waveguide pattern;
   (f) washing said second layer of epoxy resin with a solvent for the partially cured epoxy resin in said second layer to remove said partially cured epoxy resin to develop the predetermined grooved pattern of cured epoxy resin for said waveguide;
   (g) spin-coating said second layer of epoxy resin with an active polymer to fill said predetermined grooved pattern and to provide a uniform surface on said polymer layer;
   (h) coating said active polymer layer of said composite with a cladding layer of ultraviolet epoxy resin; and
   (i) curing said composite with ultraviolet light until said composite solidifies.

12. A composite optical grooved channel waveguide produced by the process set forth in claim 11.

13. A cured composite optical grooved channel waveguide in electro-optical polymers, comprising:
   (a) an electrically conductive substrate having a cured first layer of an ultraviolet epoxy resin of a uniform thickness;
   (b) a second layer of epoxy resin cured in a predetermined grooved pattern on said first layer of said ultraviolet epoxy resin to provide a waveguide;
   (c) an active polymer disposed in said predetermined grooved pattern, to a depth equal to said predetermined grooved pattern; and
   (d) a cured cladding layer disposed on said second layer of epoxy and active polymer.

14. A waveguide as set forth in claim 13, wherein said substrate is glass coated with an electrically conductive metal.

15. A waveguide as set forth in claim 14, wherein said electrically conductive metal is gold.

16. A waveguide as set forth in claim 14, wherein said electrically conductive metal is indium tin oxide.

17. A waveguide as set forth in claim 14, wherein said electrically conductive metal is aluminum.

18. A waveguide as set forth in claim 13, wherein said substrate is crystalline silicon.

19. A waveguide as set forth in claim 13, wherein said substrate is a plastic coated with electrically conductive metal.

* * * * *